United States Patent
Barbati et al.

(10) Patent No.: US 9,981,862 B2
(45) Date of Patent: May 29, 2018

(54) REACTOR USABLE FOR DECONTAMINATION OF FLUIDS AND METHOD OF USE

(71) Applicants: UNIVERSITE D'AIX-MARSEILLE, Marseilles (FR); CENTRE NATIONAL DE LA RECHERCHE SCIENTIFIQUE (CNRS), Paris (FR)

(72) Inventors: Stephane Barbati, Marseilles (FR); Serge Chiron, Marseilles (FR); Moussa Mahdi Ahmed, Djibouti (DJ); Hichem Bouzidi, Douai (FR)

(73) Assignees: UNIVERSITE D'AIX MARSEILLE, Marseilles (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 712 days.

(21) Appl. No.: 14/354,292

(22) PCT Filed: Oct. 26, 2012

(86) PCT No.: PCT/FR2012/052481
§ 371 (c)(1),
(2) Date: Apr. 25, 2014

(87) PCT Pub. No.: WO2013/061007
PCT Pub. Date: May 2, 2013

(65) Prior Publication Data
US 2014/0346124 A1 Nov. 27, 2014

(30) Foreign Application Priority Data
Oct. 27, 2011 (FR) .................................. 11 03273

(51) Int. Cl.
*C02F 1/30* (2006.01)
*C02F 1/32* (2006.01)
(Continued)

(52) U.S. Cl.
CPC .................. *C02F 1/32* (2013.01); *C02F 1/30* (2013.01); *C02F 1/725* (2013.01); (Continued)

(58) Field of Classification Search
CPC ...... C02F 1/32; C02F 1/30; C02F 1/72; C02F 2201/46105; C25B 11/0405; C25B 1/30; B01J 45/00
See application file for complete search history.

(56) References Cited

U.S. PATENT DOCUMENTS

| 5,849,985 A | 12/1998 | Tieckelmann |
| 2005/0199483 A1 | 9/2005 | Kroll |

(Continued)

FOREIGN PATENT DOCUMENTS

| DE | 41 09 872 A1 | 10/1992 |
| DE | 44 30 391 A1 | 2/1996 |
| WO | 2007/146671 A2 | 12/2007 |

*Primary Examiner* — Walter D. Griffin
*Assistant Examiner* — Cameron J Allen
(74) *Attorney, Agent, or Firm* — Lucas & Mercanti, LLP

(57) ABSTRACT

The invention relates to a method for the decontamination of contaminated liquid, as well as a reactor for implementing a decontamination method. The method comprises a step of mixing the contaminated liquid under stirring with at least one persulphate ion with the exception of ammonium persulphate, and at least iron, an iron atom or an iron ion in its ferrous or ferric form at a concentration between 50 µM and 600 µM, preferably between 100 µM and 400 µM, a second step in which the mixture obtained is subjected for a sufficient time to at least one UV/visible irradiation having a narrow wavelength spectrum comprised between 153 nm and 560 nm.

15 Claims, 1 Drawing Sheet

(51) Int. Cl.
*C02F 1/72* (2006.01)
*C02F 101/30* (2006.01)
*C02F 101/34* (2006.01)
*C02F 101/38* (2006.01)

(52) U.S. Cl.
CPC ...... *C02F 2101/30* (2013.01); *C02F 2101/34* (2013.01); *C02F 2101/38* (2013.01); *C02F 2305/10* (2013.01)

(56) References Cited

U.S. PATENT DOCUMENTS

| | | | |
|---|---|---|---|
| 2005/0242013 A1* | 11/2005 | Hunter | A61L 2/10 210/143 |
| 2006/0226083 A1* | 10/2006 | Suzuki | C02F 1/28 210/665 |
| 2010/0108609 A1* | 5/2010 | Wismer | B01J 45/00 210/668 |
| 2011/0233153 A1* | 9/2011 | Arifin | B01D 24/08 210/807 |
| 2011/0253626 A1* | 10/2011 | Everett | C02F 3/121 210/631 |

* cited by examiner

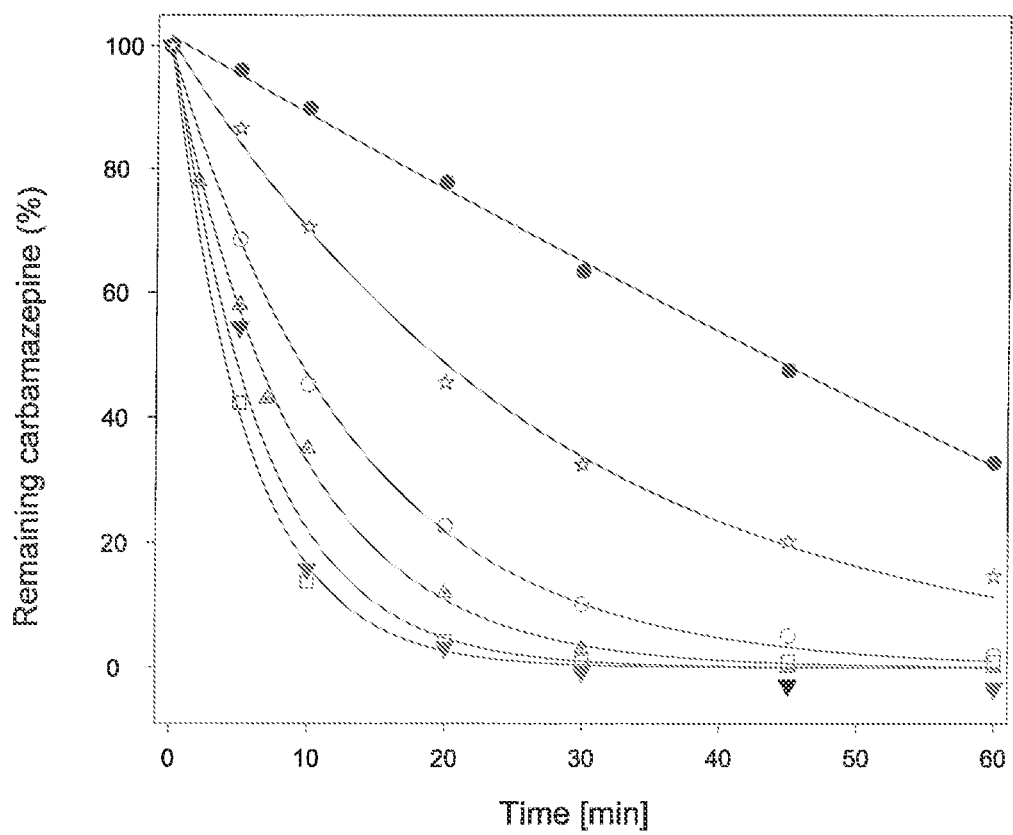

ced the priority of FR 11
REACTOR USABLE FOR DECONTAMINATION OF FLUIDS AND METHOD OF USE

CROSS-REFERENCE TO RELATED APPLICATIONS

This application is a 371 of PCT/FR2012/052481 filed Oct. 26, 2012, which in turn claims the priority of FR 11 03273 filed Oct. 27, 2011, the priority of both applications is hereby claimed and both applications are incorporated by reference herein.

The present application relates to the field of disinfection and depollution of fluids, and more particularly a method for the decontamination of contaminated liquid in order to reduce the quantity of non-biodegradable organic compounds, as well as a reactor for implementing such a method for the decontamination of contaminated liquid.

The contamination of surface water and groundwater by organic micropollutants due to human activity today constitutes a major environmental concern (water quality, environmental impact, feminization of fish, etc.). Wastewater treatment plants, common tanks for urban, industrial and hospital effluents are currently almost the only wastewater treatment means. However it has been found that these treatment plants, based on the principle of purification by the biological route, are not capable of fully treating the micropollutants, which are consequently found, with their metabolites, in natural waters.

The presence of these organic compounds in the natural resources also poses health problems.

Different methods have been described in the prior art for treating wastewaters in order to reuse them for consumption, hygiene, industry or also agriculture.

The currently available physical and chemical treatment systems exclusively use oxidation by hydroxyl radicals generated by coupling a chemical species (hydrogen peroxide solution or ozone or peroxone) with a method of physical activation by electromagnetic radiation. One of the drawbacks of these methods is that they require pH adjustment by adding a large quantity of acid (Fenton's process) or base (ozonolysis process).

Thus there is a need for a system for the treatment of contaminated liquids which would provide improved targeting of the degradation of non-biodegradable organic compounds, and which would not have the drawbacks of the existing methods.

A satisfactory outcome would be to make available a method for the decontamination of liquid that would more efficiently reduce the quantity of non-biodegradable organic compounds contained in this liquid.

The present invention aims to provide a method for the decontamination of liquid allowing improved targeting of the degradation of non-biodegradable organic compounds.

Surprisingly, after lengthy research, the inventors have shown that mixing a contaminated liquid with at least one persulphate ion, in combination with at least iron, and irradiation by UV/visible radiation having a narrow wavelength spectrum comprised between 153 nm and 560 nm, does in fact allow improved targeting of the degradation of the non-biodegradable organic compounds, owing to the greater selectivity of the sulphate radical with respect to the hydroxyl radical, in relation to the targeted non-biodegradable organic compounds. This is explained by the fact that the complex matrix of a water containing particularly organic compounds of natural origin, has a tendency to inhibit the action of the oxidizing species.

One of the purposes of the present invention is to provide such a method.

By contaminated liquid is meant in the present text any liquid, for example urban or industrial wastewaters, such as those originating from a pharmaceutical, hospital, cosmetics or agri-food process, containing non-biodegradable organic compounds. Preferentially the liquid can be water. By extension the term "liquid" encompasses liquids capable of containing a gas phase.

The liquid to be decontaminated according to the invention can be any polluted liquid the depollution of which is necessary before disposal and/or reuse, mainly for domestic uses.

By organic non biodegradable compound is meant here any compound the undesirable character of which can be due to its harmfulness (toxicity) to the health of the human or animal organism, that is non-biodegradable, i.e. is not degraded by the standard biological, physical and chemical degradation methods such as for example the methods used in treatment plants; these compounds may equally well be carbon- hydrogen- and possibly oxygen-based, and/or heteroatoms such as sulphur, nitrogen and phosphorus, such as for example pharmaceutical substances, cosmetics, pesticides.

By decontaminated liquid is meant in the present text a liquid the non-biodegradable organic compound content of which is acceptable according to the criteria set by the envisaged use of the liquid after decontamination. This can mean in particular that the quantity of non-biodegradable organic compounds in the decontaminated liquid has been reduced to the maximum extent or even completely.

The inventors thus propose a method for the decontamination of liquid that can be used for decontaminating liquids containing non-biodegradable organic compounds, as well as a reactor for decontaminating said liquids.

Thus a first subject of the invention is a method for the decontamination of liquid contaminated by non-biodegradable organic compounds, comprising the following steps:
 the contaminated liquid is mixed under stirring with at least one persulphate ion, and at least iron at a concentration comprised between 50 µM and 600 µM, preferably between 100 µM and 400 µM;
 the mixture obtained is subjected for a sufficient time to at least one UV/visible irradiation having a narrow wavelength spectrum comprised between 153 nm and 560 nm.

By persulphate ion according to the invention is meant any known form of persulphate ions, with the exception of ammonium persulphate, and more particularly those comprised in the following list: sodium persulphate, potassium persulphate, barium persulphate. Preferably, ions the counter-ions of which are not toxic for the environment can be used as persulphate ions, such as sodium persulphate or potassium persulphate. Even more preferably, sodium persulphate can be used according to the invention.

According to the first step of the invention, mixing takes place under stirring, and thus makes it possible to ensure the homogeneity of the medium. The stirring system can be for example a conventional paddle system. This mixing can be carried out at a speed varying between 200 and 700 rpm, preferentially between 400 and 600 rpm.

According to the invention, the pH of the mixture obtained in the first step of the method can be between 1 and 7, preferentially between 2 and 4. In fact, the inventors observed that the decontamination of liquid contaminated by non-biodegradable organic compounds was more efficient at a pH comprised between 2 and 4.

According to the invention, it can be envisaged to keep the pH within this range of values, by means of the addition of acid or base to the liquid to be decontaminated during the implementation of the method.

According to the invention, in the first step of the method the contaminated liquid is mixed with at least one catalyst which can be iron.

The inventors have in fact shown that combining the persulphate/iron system with UV irradiation improves the efficiency of the degradation of the non-biodegradable organic compounds, and makes it possible to achieve higher rates of removal thereof. The use of UV light is involved in the photo-reduction of the iron ions in ferric form, producing additional hydroxyl radicals and at the same time allowing the regeneration of the iron ions in ferrous form necessary for activation of the persulphate.

By iron is meant according to the invention an iron atom or an iron ion in its ferrous or ferric form. Examples of iron in the form of ferrous iron are ferrous iron sulphate, ferrous iron chloride, or also the double salt of ferrous ammonium sulphate, preferentially ferrous iron sulphate. Examples of iron in the form of ferric iron can be ferric iron sulphate, ferric iron nitrate, ferric iron chloride, or also the double salt of ferric ammonium sulphate preferentially ferric iron sulphate. Preferably the iron can be used in its ferrous form. The ferrous or ferric iron can be presented in a macromolecular, micromolecular, or nanoparticulate form. Preferentially, iron initially in nanoparticulate form can be used. In fact, the inventors have shown that for the same concentration, the increased specific surface of the nanoparticulate form allows much better results to be obtained.

By nanoparticulate form is meant according to the invention a nanoparticle size comprised between 40 and 200 nanometres, preferentially between 60 and 120 nanometres.

Still according to the invention, the iron atom or iron ion concentration of the mixture can be between 50 $\mu$M and 600 $\mu$M, preferably between 100 $\mu$M and 400 $\mu$M.

According to the invention, the molar ratio [initial persulphate concentration]/[initial iron concentration] can be between 0.5 and 5, preferably between 1 and 3.

According to the invention, a person skilled in the art will know how to calculate the persulphate concentration necessary according to the invention, depending on the chosen iron concentration and the desired molar ratio [initial persulphate concentration]/[initial iron concentration].

According to a second step, the mixture obtained in the first step is subjected for a given time to at least one UV/visible irradiation having a narrow wavelength spectrum comprised between 153 nm and 560 nm. Preferentially, a wavelength comprised between 240 nm and 300 nm, even more preferentially centred at 254 nm, can be chosen.

According to the invention, the UV irradiation can be produced in particular by lamps, tubes, light-emitting diodes (LEDs). According to the invention, by sufficient time is meant the time necessary to obtain the desired level of non-biodegradable organic compounds in the decontaminated liquid; this level may correspond to the desired or required criteria for the use in question. A person skilled in the art will know how to adapt this time based on his knowledge of the field.

It is also understood that the UV radiation spectrum can extend on either side of this peak by 30 nm, advantageously 10 nm. Thus, a UV lamp emitting light having a narrow wavelength spectrum centred at 254 nm may in fact emit a light of a wavelength comprised between 224 nm and 284 nm, advantageously between 244 nm and 264 nm.

According to the second step of the method of the invention said mixture can be subjected to UV radiation for a time comprised between 10 minutes and 120 minutes, advantageously 15 minutes and 60 minutes, very advantageously between 15 minutes and 30 minutes.

According to the method, the fluid is mixed under stirring with at least one persulphate ion, for at least the time necessary for the mixture to become homogeneous, and optionally also during the irradiation time. This means that the second step of the method can take place at the same time as the first step. According to another embodiment of the invention, the second step can take place after the first step, i.e. the stirring is stopped when the second step begins. Advantageously the first two steps of the method can take place simultaneously.

The inventors have demonstrated that the decontamination method is even more efficient when the UV irradiation is carried out by one or more light-emitting diode(s) (LED). The use of light-emitting diodes (LEDs) producing UV radiation has numerous advantages compared with UV lamps, LEDs emit at a single wavelength (they do not present a diffuse spectrum like medium pressure mercury UV lamps and it is thus possible to choose the appropriate wavelength(s). The other benefits are economic (the lifetime of LEDs is 10 to 100 times greater than that of lamps). They produce little heat; do not require a large amount of energy to operate and the electrical power conversion/UV dose emitted is much greater than that of the regular lamps). LEDs are in addition shock-resistant and practical in use: it is much easier to envisage new configurations for UV reactors with LEDs than with UV lamps, due to their small space requirement, easier orientation of the light radiation, the possibilities for adjusting the number of LED(s) to the flow rate of water to be treated, etc.). In addition, they have advantages in the field of environmental protection: LEDs do not contain toxic substances such as mercury, and in the context of the REACH directive which relates in particular to the substitution of toxic compounds with less toxic compounds, LEDs are particularly suitable.

Thus, according to a variant of the invention, irradiation can be provided in the method by one or more LEDs. The LEDs are preferably commercially available LEDs. There may be mentioned for example a UV-LED emitting at 254 nm. By way of example the LEDs supplied by Seoul Optidevice Co Ltd (South Korea), Nichia Corporation (Japan), or SunLED Corporation (United States) may be mentioned.

According to a variant of the invention, adding a third step to the method can be envisaged. This step may correspond to a step of recovery of the decontaminated liquid. It is possible to envisage this step being carried out by any suitable technique allowing such recovery. There may be mentioned for example one or more of the methods chosen from filtration, gravimetric or reduced-pressure methods, decantation, or also precipitation methods followed by gravimetric filtration.

The inventors have also demonstrated the efficiency of a reactor for implementing a method for the decontamination of a contaminated liquid.

Thus, a further subject of the invention is a reactor for the decontamination of liquid, comprising at least one means of addition of at least one persulphate ion, with the exception of ammonium persulphate, at least one iron atom or an iron ion in its ferrous or ferric form at a concentration between 50 $\mu$M and 600 $\mu$M, preferably between 100 $\mu$M and 400 $\mu$M, at least one means of mixing said liquid under stirring, at least one UV/visible irradiation means having a narrow wavelength spectrum comprised between 153 nm and 560 nm, preferentially between 240 nm and 300 nm, preferentially centred at 254 nm.

According to the invention, the UV irradiation can be carried out by at least one light-emitting diode.

By reactor is meant a container capable of receiving, during a defined time period, a liquid to be decontaminated; said container comprising a means for mixing the liquid with the persulphate ion and with iron, said reactor being moreover equipped with at least one UV light source the action of which on the liquid can result in decontamination of said fluid.

According to the reactor of the invention, the addition of persulphate ions or iron, and the mixing of the liquid with the persulphate ions or with iron can be carried out in the reactor before the UV irradiation, which means that the liquid is mixed with the persulphate ions or with iron before being irradiated, or it can be arranged for the reactor to allow the addition and mixing of the persulphate ions or iron with the liquid at the same moment that the irradiation takes place.

According to a third embodiment of the invention, the addition of persulphate ions or iron can take place before mixing the liquid; the liquid can be mixed at the same time as, or before, the irradiation. It can be also envisaged that the addition of persulphate ions and the addition of iron are not carried out at the same time. In fact, according to the invention, the persulphate can be added to the liquid before, at the same time as, or after the iron.

According to the invention, the UV lamp(s) may be arranged at the level of the reactor either in such a way that they are not in direct contact with the liquid to be decontaminated or in such a way that they are in contact with or immersed in said liquid.

According to a variant of the invention, said reactor can moreover comprise at least one inlet for the liquid to be decontaminated, and at least one outlet for the decontaminated liquid. According to this variant, the inlet of the liquid and the outlet of the liquid can be arranged at opposite ends of the reactor.

Any shape, material and dimensions of the reactor according to the invention can be used. Thus, the reactor can adopt any desired shapes and any desired dimensions, which will be adapted by a person skilled in the art depending on the envisaged use of the reactor according to the invention.

As non-limitative examples of materials of which the reactor could consist, there may be mentioned polymers (including plastics), metal, concrete, glass, quartz, stainless steel or any combination of these materials.

The reactor can in particular be an open or closed container in which the liquid to be decontaminated can flow while being mixed under stirring with at least one persulphate ion, while remaining in contact with at least one UV/visible source emitting light having a narrow wavelength spectrum comprised between 153 nm and 560 nm for the time required for complete decontamination.

According to a variant of the invention, the reactor can be an open or closed tank in which the liquid to be decontaminated is stored, said tank being equipped with at least one means of mixing said liquid under stirring, at least one means of adding at least one persulphate ion, at least one UV/visible source emitting light having a narrow wavelength spectrum comprised between 153 nm and 560 nm, preferentially between 240 nm and 300 nm, preferentially centred at 254 nm.

A particularly suitable shape for the reactor according to the invention is that of a tube in which the fluid can flow, said tube bearing at least one means of adding at least one persulphate ion, at least iron, at least one mixing means, and at least one UV/visible irradiation means emitting light having a narrow wavelength spectrum comprised between 153 nm and 560 nm, preferentially between 240 nm and 300 nm, over its length, in a aperture such that the light emission takes place inside the tube where the fluid to be decontaminated is flowing. In a variant, the irradiation means will be positioned on a support arranged inside said tube in contact with the fluid to be decontaminated.

According to another variant, said reactor may moreover comprise a system for adjusting the pH, in order to maintain the pH of the liquid mixed with the persulphate at a value comprised within a range from 1 to 7, preferentially 2 to 4. According to another variant, said reactor can also comprise at least one means of recovering the decontaminated liquid.

According to the invention, said reactor can moreover comprise any device that is useful to its satisfactory operation and/or its safety, such as for example inlet and/or outlet valves, a valve stopping the flow of the liquid to be decontaminated, one or more circulation pump(s), one or more light intensity sensor(s), a device for measuring the optical density or the turbidity of the liquid to be decontaminated, a pressure measurement device or also a temperature measurement device.

EXAMPLE

Experimental Protocol:

A polychromatic medium pressure mercury lamp (Model TQ 150 from Heraeus) emitting at maximum wavelengths of 254, 273, 313, 366, 406, 436, 546 and 578 nm) is used for the irradiation. The latter is preheated for 10 to 20 minutes in order to give a constant photon flux.

Under irradiation by the lamp, an aqueous solution of carbamazepine is prepared having an initial concentration of 50 µM, the pH of which is adjusted to 3 by adding a suitable volume of a 1 m sulphuric acid solution. The solution is kept under stirring at 500 rpm.

Suitable volumes of sodium persulphate and ferrous iron sulphate are successively injected to give an initial concentration of 200 µM and of 100 µM respectively.

6 samples having a ferrous iron concentration according to the table below are prepared with the solution obtained previously:

| Sample | Symbol FIG. 1 | $[Fe^{2+}]$ = |
|---|---|---|
| (a) | ● | 1 µM, |
| (b) | ○ | 5 µM, |
| (c) | ★ | 12.5 µM, |
| (d) | △ | 50 µM, |
| (e) | □ | 100 µM, |
| (f) | ▼ | 400 µM, |

The mixture is kept under irradiation for 60 minutes. The carbamazepine concentration is then measured in each sample in order to investigate the influence of the ferrous iron concentration on the degradation of carbamazepine.

The results are given in FIG. 1.

It is noted that almost all of the carbamazepine is destroyed after 30 minutes of incubation at ferrous iron concentrations above 50 µM.

The invention claimed is:
1. Method for the decontamination of a contaminated liquid comprising non-biodegradable organic compounds, comprising the following steps:

mixing the contaminated liquid comprising non-biodegradable organic compounds, under stirring, with at least one persulfate ion with the exception of ammonium, and at least one iron atom or an iron ion in its ferrous or ferric form at a concentration between 50 μM and 600 μM, to obtain a mixture;

subjecting the obtained mixture to at least one UV/visible irradiation having a narrow wavelength spectrum comprised between 153 nm and 560 nm.

2. Method according to claim 1, characterized in that in the first step the persulfate is chosen from sodium persulfate, potassium persulfate or barium persulfate.

3. Method according to claim 2, characterized in that the persulfate is chosen from sodium persulfate and potassium persulfate.

4. Method according to one of claim 2, characterized in that the persulfate is sodium persulfate.

5. Method according to claim 1, characterized in that the pH of the mixture obtained in the first step of the method is between 1 and 7.

6. Method according to claim 1, characterized in that in the first step the iron is in ferrous form.

7. Method according to claim 6, characterized in that the iron is in macromolecular, micromolecular or nanoparticulate form.

8. Method according to claim 1, characterized in that the molar ratio [initial persulphate concentration]/[initial iron concentration] is comprised between 0.5 and 5.

9. Method according to claim 8, characterized in that the UV irradiation carried out in the second step has a narrow wavelength spectrum comprised between 240 and 300 nm.

10. Method according to claim 1, characterized in that the UV irradiation is carried out by at least one light-emitting diode.

11. The method according to claim 1, wherein the contaminated liquid is at a concentration between 100 μM and 400 μM.

12. The method according to claim 5, wherein the pH of the mixture obtained in the first step of the method is between 2 and 4.

13. Method according to claim 6, wherein the iron is in nanoparticulate form.

14. Method according to claim 8, wherein the molar ratio [initial persulfate concentration]/[initial iron concentration] is comprised between 1 and 3.

15. Method according to claim 9, wherein the UV irradiation carried out in the second step has a narrow wavelength spectrum is centered at 254 nm.

* * * * *